(12) United States Patent
Phillips

(10) Patent No.: US 9,065,569 B2
(45) Date of Patent: Jun. 23, 2015

(54) MOBILE DEVICE OUTPUT TEST SETTING

(75) Inventor: Simon Phillips, York (GB)

(73) Assignee: MasterCard International Incorporated, Purchase, NY (US)

( * ) Notice: Subject to any disclaimer, the term of this patent is extended or adjusted under 35 U.S.C. 154(b) by 460 days.

(21) Appl. No.: 13/281,860

(22) Filed: Oct. 26, 2011

(65) Prior Publication Data

US 2013/0109446 A1 May 2, 2013

(51) Int. Cl.
*H04M 1/00* (2006.01)
*H04B 17/29* (2015.01)
*H04W 24/06* (2009.01)

(52) U.S. Cl.
CPC ............... *H04B 17/29* (2013.01); *H04W 24/06* (2013.01)

(58) Field of Classification Search
CPC .............................. H04B 17/008; H04W 24/06
USPC ........... 455/571, 412.1, 552, 410, 404.2, 518, 455/426.1, 509, 566, 127.1, 575.1
See application file for complete search history.

(56) References Cited

U.S. PATENT DOCUMENTS

| | | | |
|---|---|---|---|
| 7,864,043 B2* | 1/2011 | Camp et al. ............ | 340/539.13 |
| 2007/0037605 A1* | 2/2007 | Logan ...................... | 455/567 |
| 2007/0078981 A1* | 4/2007 | Alberth et al. ............ | 709/225 |
| 2008/0151842 A1* | 6/2008 | Tysowski et al. ......... | 370/338 |
| 2011/0103318 A1* | 5/2011 | Ekici et al. ............... | 370/329 |
| 2011/0103359 A1* | 5/2011 | Cho et al. ................. | 370/338 |
| 2011/0175705 A1* | 7/2011 | Bellows .................... | 340/10.1 |
| 2011/0188609 A1* | 8/2011 | Minato et al. ............. | 375/316 |
| 2011/0287795 A1* | 11/2011 | Cahill ....................... | 455/509 |
| 2012/0013296 A1* | 1/2012 | Heydari et al. ........... | 320/108 |
| 2012/0039284 A1* | 2/2012 | Barbieri et al. ........... | 370/329 |
| 2012/0115464 A1* | 5/2012 | Jang ......................... | 455/426.1 |
| 2012/0140658 A1* | 6/2012 | Kanzaki et al. ........... | 370/252 |
| 2012/0187851 A1* | 7/2012 | Huggins et al. ........... | 315/159 |
| 2012/0290660 A1* | 11/2012 | Rao et al. .................. | 709/204 |
| 2012/0294215 A1* | 11/2012 | Ekici et al. ................ | 370/311 |
| 2012/0299707 A1* | 11/2012 | Centanni et al. .......... | 340/10.4 |
| 2012/0303502 A1* | 11/2012 | Centanni et al. .......... | 705/35 |
| 2013/0021276 A1* | 1/2013 | Bang ......................... | 345/173 |
| 2013/0100928 A1* | 4/2013 | Matsumori et al. ...... | 370/331 |

* cited by examiner

*Primary Examiner* — Joseph Arevalo
(74) *Attorney, Agent, or Firm* — Buckley, Maschoff & Talwalkar LLC

(57) ABSTRACT

A method and a wireless communication device including a housing, at least one user interface element to receive a user input, a transmitter to transmit a wireless communication signal; and a processor in the housing. The processor being enabled to detect a first signal; switch, in response to detecting the first signal, the transmitter from a first transmission mode to a second transmission mode, at least one of a transmit power and a transmit frequency associated with the second transmission mode being selectively set by a user via the user interface element; receive a second signal, the second signal including an indication of a value selected by the user; and set, in response to receiving the second signal, the at least one of transmit power and transmit frequency associated with the second transmission mode to the value selected by the user.

18 Claims, 5 Drawing Sheets

MOBILE DEVICE OUTPUT TEST SETTING

BACKGROUND

The use of mobile phones and other devices including some type of wireless communication functionality is widespread. Further development and deployment of devices including one or more types of wireless communication functionality continues due to a desire for devices that offer greater capabilities, convenience, and mobility. The proliferation of wireless communication devices offers the millions of users of such devices the ability and freedom to communicate with others and information services, typically without the constraints of a fixed location and time.

Numerous proposals have been made to standardize wireless communication protocols in an effort to obtain compatibility between various electronic devices, including devices from different manufacturers. Even in instances where the communication protocol(s) employed by the various devices have been established, the operation of a first device may be impacted or interfered with by the operation of another second device in close proximity of the first device. Therefore, standardization of communication protocols, restricting the use of each type of wireless communication to certain transmission frequency bandwidths and powers in a given geographic area, and other measures have been proposed and adopted in an effort to limit the radio frequency ("RF") interference experienced between wireless communication and other devices.

Device manufactures, governing municipal regulatory agencies, consumer protections entities, and others may have a duty or interest in determining whether a particular device is susceptible to interference from a wireless communication device since some such RF interference may prevent the device from operating as it is intended or designed to operate. While improper operation of an electronic device such as a portable gaming device due to RF interference may primarily only cause an inconvenience, other instances of electronic devices operating improperly may raise greater concerns, including a safety concern for example. Medical equipment, aviation equipment, automobile navigation devices, and other types of devices being susceptible to interference from a wireless communication device may put the safety of a user or others at risk. Device manufactures, municipal regulatory agencies, and others may thus test wireless communication devices to determine whether they do in fact interfere with the operation of other devices.

The testing of the susceptibility of devices to interference from a wireless communication device often requires the use of specialized test equipment and a shielded test facility that isolates the specialized test equipment and devices under test from other possible interference contributing factors. However, the use of the specialized test equipment and the shielded test facility may be expensive, time consuming, and may not be representative of actual operational conditions the device under test for interference susceptibility may experience when being used by a user or consumer in a real-world environment.

The present inventors have now realized that it may be desirable to provide improved testing capabilities in a mobile wireless communication device, in connection with procedures in the mobile wireless communication device.

DETAILED DESCRIPTION

In general, and for the purpose of introducing concepts of embodiments of the present invention, the functionality of a mobile wireless device is enhanced by providing a mode of operation that is selectively invoked by the user and for which values for parameters of a wireless signal transmitted while in this mode of operation are selectively set by the user. In some aspects, the transmission mode selectively invoked by the user wherein the user may also selectively set values for the parameters of the wireless signal transmitted is referred to herein as a second transmission mode and, alternatively, as a test mode or engineering mode. In some aspects, the second transmission mode is distinct from a first transmission mode. The first transmission mode of a wireless device in some embodiments herein may be characterized by transmission of wireless communication signals for which the values of the transmitted wireless signal are not selectively set by the user.

In some embodiments, the wireless communication device to provide the processes and methods disclosed herein may be a mobile telephone or electronic device including mobile telephony functionality, as will be described in greater detail below. In some embodiments, the wireless communication device may be an electronic device other than a mobile telephone, where the device may transmit and/or receive wireless communication signals other than cellular signals for the purpose of mobile telephone calls and data transmissions.

Figure 1:
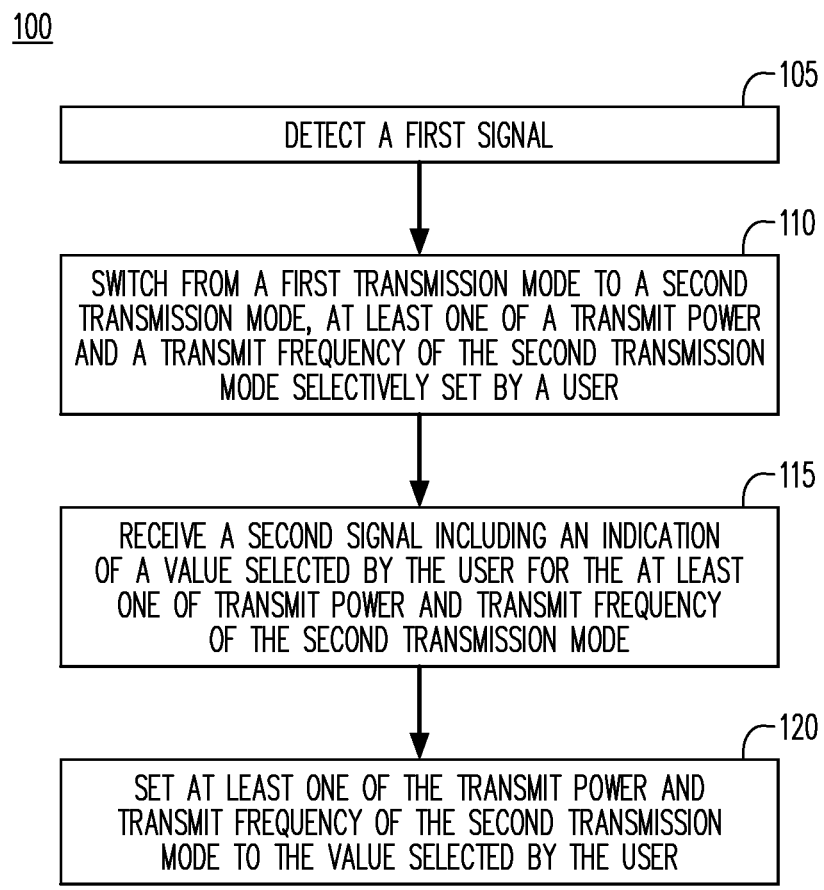
FIG. 1 is a flow chart illustrating processes that may be performed in accordance with aspects of some embodiments herein.

FIG. 1 is an illustration of a flow diagram for a process 100, in accordance with some embodiments of the present disclosure. Process 100 may provide an example flow of operations to operate a wireless communication device (e.g., a mobile telephone) in a first transmission mode and a second transmission mode distinct from the first transmission mode. The second transmission mode of operation may be selectively invoked by the owner or other user of the wireless communication device, at their discretion. For example, process 100 may be performed by a user of the mobile telephone to determine whether operation of another or second device is interfered with or impacted by transmission of wireless signals from the mobile telephone in a vicinity of the second device. At operation 105, a first signal is detected by the mobile phone. The detected signal may be generated in response to a user input or user action to initiate or invoke the second transmission mode.

In some embodiments, the second transmission mode is not a generally accessible mode of operation of the mobile telephone or other wireless communication device. For example, an option for selecting, initiating, entering, or invoking the second transmission mode herein may not normally be visible or otherwise presented to the user of the mobile telephone. Access to select, initiate, enter, or invoke the second transmission mode herein may first require a user input or action that acts to initiate or invoke the second transmission mode. This first user input may comprise operation 105.

In some embodiments, one or more features may be provided to guard against a user inadvertently or mistakenly operating the mobile phone in the second transmission mode herein. Some of these features may include having the user provide a "security" code or other deliberative act to positively indicate they desire to initiate the second transmission mode. In some embodiments, the user may provide a known sequence of one or more user input entries. In accordance with the capabilities and configuration of the mobile telephone, the sequence of user input entries may be supplied to the mobile telephone by the user using a numeric keypad, a "qwerty" keyboard, a virtual or "soft" keyboard presented on a touchscreen, gesture inputs on a touchscreen, voice input, and other user interface input methods. In some embodiments, the sequence of user input entries may be established on the mobile telephone by an electronic device manufacturer prior to delivery of the mobile telephone to the user. In some embodiments, the sequence of user input entries may be implemented or updated after the time of manufacture and/or deployment. The sequence of user input entries for initiating or invoking the second transmission mode herein may be associated with the mobile telephone via an over the air update, installation of a microSD card (or other memory module form factor/medium), by a SIM (subscriber identity module) card to be installed in the mobile telephone, and other means of facilitating an operational functionality of the mobile telephone.

In some embodiments, a security feature to safeguard against unintended operation of the second transmission mode may include a user installing or interfacing a secure digital ("SD"), microSD card, or other memory form factor; a SIM card; or some other device with the mobile telephone that may include codes, instructions, or other mechanisms for authorizing the user to operate the mobile phone in the second transmission mode disclosed herein. Some such security features may include a personal identification number ("PIN") code to be received from the user.

In some embodiments, the first signal detected at operation 105 may encompass a user input action including moving the mobile telephone in a specific pattern, including, in some aspects, with a specific velocity and sequence of directions and motions. In some aspects, the specific pattern may be pre-set by the mobile phone manufacturer and/or supplier, while in other embodiments the user may establish the pattern to generate the first signal.

In some embodiments, the user input and action to generate the first signal of operation 105 may be a combination of the one or more types of user inputs and actions discussed hereinabove. In some embodiments, a user may be asked for or otherwise prompted to re-enter the user input or action to confirm the user truly desires to operate the mobile telephone in the second transmission mode.

At operation 110, in response to detecting the first signal, the mobile phone switches from operating in the first transmission mode to operating in the second transmission mode. The second transmission mode may provide a mechanism for the user of the mobile telephone to set a value for one or more signal transmission parameters. In some embodiments, the transmission parameters that may be set by the user may include at least one of a transmit power and a transmit frequency. In some embodiments, the transmission parameters that may be set by the user may include, either alone or in combination with the transmit power and transmit frequency parameters, a frequency channel or sub-channel, a transmission duration, and other transmission signal parameters.

As previously introduced, the first mode of operation may be characterized by a mode of operation wherein the user does not set the values of the signal transmitted by the mobile telephone. In particular, the first transmission mode may include a mobile telephone operating to transmit mobile phone calls, text messages, and other data transmission signals with transmit powers and frequencies set as determined and adjusted by the mobile telephone manufacturer and mobile telephone service provider. In some aspects, the mobile telephone may be operating or configured to operate by a process or operation (not shown) in the first transmission mode prior to the detecting of the first signal at operation 105.

At operation 115, a second signal is received by the mobile telephone. The second signal may include an indication of a value selectively chosen by the user for setting or tuning the transmission parameters of the wireless signal to be transmitted in the second transmission mode. The value may be selectively set by the user in one or more methods. Some of the methods for a user to provide input of a value for the transmission signal parameter include the use of a keypad, keyboard, touchscreen, voice input, and other user interface input methods of the mobile telephone.

In some embodiments, the user may provide a specific input value for the transmission signal parameters of operation 115. For example, the user may be prompted via a user interface screen or display of the mobile telephone to provide a value for at least one of the transmit power and the transmit frequency for the wireless communication signal to be transmitted when the mobile telephone is operative in the second transmission mode. The user may be requested to enter a numeric value. As an example, the user may provide an entry of 30 dBm for a transmit output power or an entry of a GSM 1800 MHz frequency for a transmit output frequency. In some embodiments, the user may enter a numeric value or a percentage of a maximum or other value. In the instance the user enters an unacceptable value, the mobile telephone may then request the user to provide a valid entry. The user entry may be unacceptable, for example, because it is not within the operational tolerances of the mobile telephone. In some other embodiments the user may select a value for the second transmission mode parameters from a menu, listing, or other presentation of acceptable choices. For example, a user interface on a touchscreen of the mobile telephone may present a menu listing a number of transmit power value choices (e.g., 30 dBm, 33 dBM, High power, Low power, Nominal power, etc.) and a number of transmit frequency value choices (e.g., 1800 MHz, 1900 MHz, 850 MHz, 2.4 GHz, etc.). In some embodiments, a value for a first parameter (e.g., a transmit power) may limit the potential acceptable values for a second or other parameter value (e.g., a transmit frequency) since there may be a dependency between the parameters as dictated by device capabilities and/or controlling device operation rules, regulations, and other constraints.

In some embodiments, the user may selectively provide a value for the second transmission mode parameters using a user interface element of a graphical user interface (GUI) presented by the mobile telephone. For example, the user may selectively set the transmit power, transmit frequency, and other transmit parameters using a "slider" control, a "spinner" control, and a "fuel gauge" control presented in the GUI of the mobile telephone. Each of these GUI controllers may permit the user to enter a numeric value, percentage, or portion of a total value bounded by a minimum value and a maximum value.

Returning to method 100 of FIG. 1, the parameters of the second transmission mode are selectively set to the values chosen by the user at operation 120. In this manner, the mobile telephone is able to operate and transmit a wireless communication signal having the values selectively set by the user in the second transmission (i.e., test) mode.

In the illustrated example of FIG. 1, the user provides a value for at least one of the transmit power and the transmit frequency for the signal to be transmitted when the mobile telephone is operating in the second transmission mode. However, additional, fewer, or other alternative and substitute parameters may be set, changed, or varied based on a user's inputs and actions.

Figure 2:
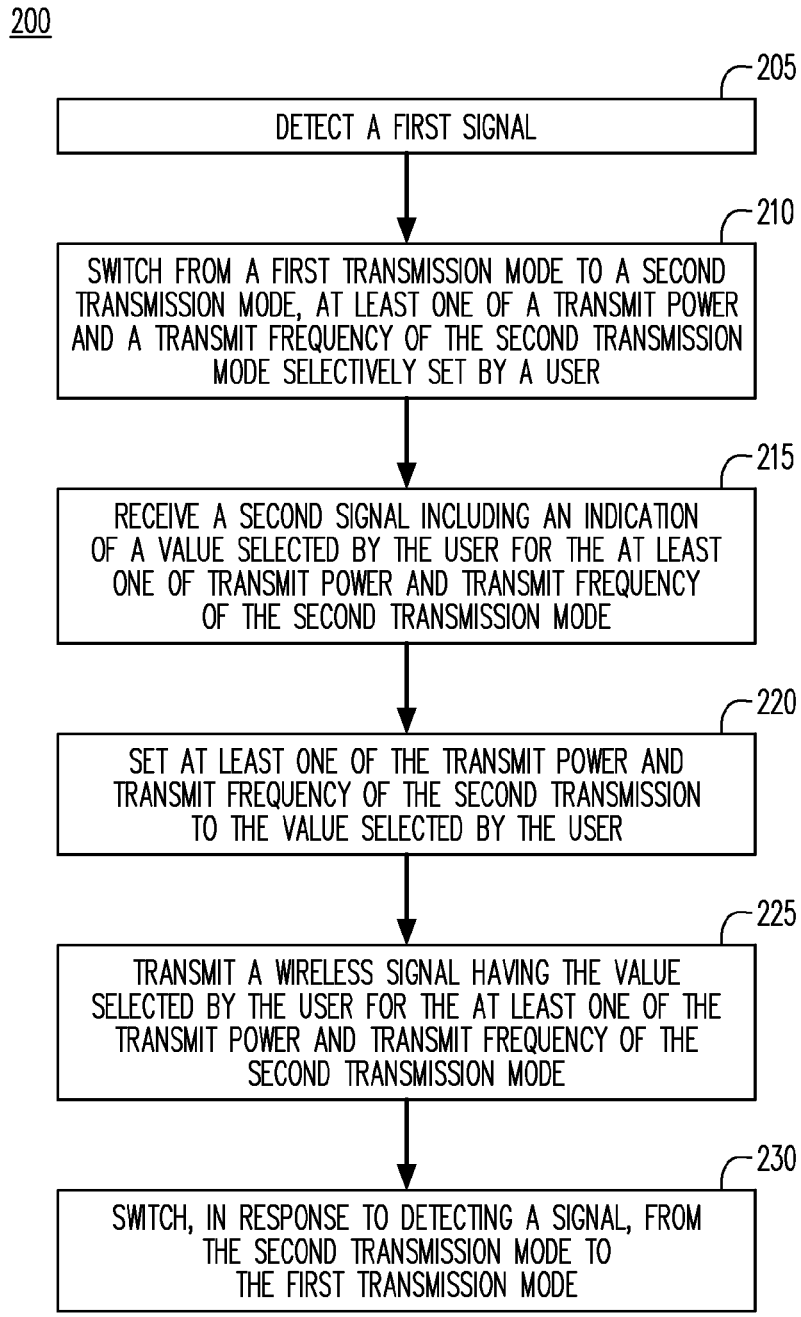
FIG. 2 is another flow chart illustrating processes that may be performed in accordance with aspects of some embodiments herein.

FIG. 2 is an illustrative flow diagram of a method 200, in accordance with some embodiments herein. In some aspects, operations 205, 210, 215, and 220 of FIG. 2 may generally correspond to the operations of FIG. 1 referenced at 105, 110, 115, and 120, respectively. Therefore, a detailed discussion of operations 205, 210, 215, and 220 is not provided herein since a full understanding of these operations may be had by referring to the detailed discussion of operations 105, 110, 115, and 120 above.

After a user has initiated and invoked the second transmission mode of a mobile telephone or other electronic device as depicted in operations 205 and 210, the mobile telephone has received user provided values for at least some parameters of a wireless signal to be transmitted by the mobile telephone during the second transmission mode of operation as shown at operation 215, and the mobile phones sets the second transmission mode parameters as prescribed by the user-supplied values at operation 220, the mobile telephone or other wireless communication device may proceed to transmit a wireless transmission signal with the value(s) selected by the user at operation 225. In a manner similar to that described above regarding method 100, the particular parameters set by the user in the second transmission mode may include at least one of a transmit power and a transmit frequency for the wireless transmission signal, although additional, fewer, and alternative parameters may be selectively set, varied, changed, and engaged by the user.

Continuing with method 200, operation 230 references a process for switching the mobile telephone from the second transmission mode to the first transmission mode in response to detecting a third signal. The third signal may cause the mobile telephone to switch from the second transmission mode and may include a termination signal, a timeout signal, and other signals that indicate the second transmission mode of operation is to end. The termination signal may be generated in response to a user input or action indicating the user desires to end the second transmission mode. The termination signal generated in response to the user provided input or action may include at least one user input, including for example a keypad or keyboard entry, a voice input entry, and other user inputs. The timeout signal may be provided as a feature of the mobile telephone or a module, circuitry, program instruction, application, or service associated with the second transmission mode. In some embodiments, a timer (e.g., either a descending or ascending counter) may be used to provide a timing signal that controls a time limit for the operation of the mobile telephone in the second transmission mode. In some aspects, minimum and/or maximum timeout values for the timer may be set by the mobile telephone manufacturer, the telephone or other wireless communication service provider, and the user.

In some embodiments, the lack of a specific termination signal or a timeout signal may act as a signal to cause the mobile telephone to switch from the second transmission mode to the first transmission mode at operation 230. In some instances, the termination signal, timeout signal, other signals, and the lack of any other specific signal may operate to end the operation of the mobile telephone in the second transmission mode. In some embodiments, operating the mobile telephone in the second transmission mode may include transmitting a wireless communication signal at a maximum permissible power level for the given frequency of the wireless communication signal. In some instances, it may be desirable to limit the transmission of the wireless communication signal at a maximum (or other test mode power and/or frequency) for one or more reasons. Some of the reasons may include conserving power consumption of the mobile telephone and limiting the potential for the mobile telephone to interfere with other electronic devices in a vicinity of the mobile phone transmitting at the maximum (or other) output power and/or frequency.

Figure 3:
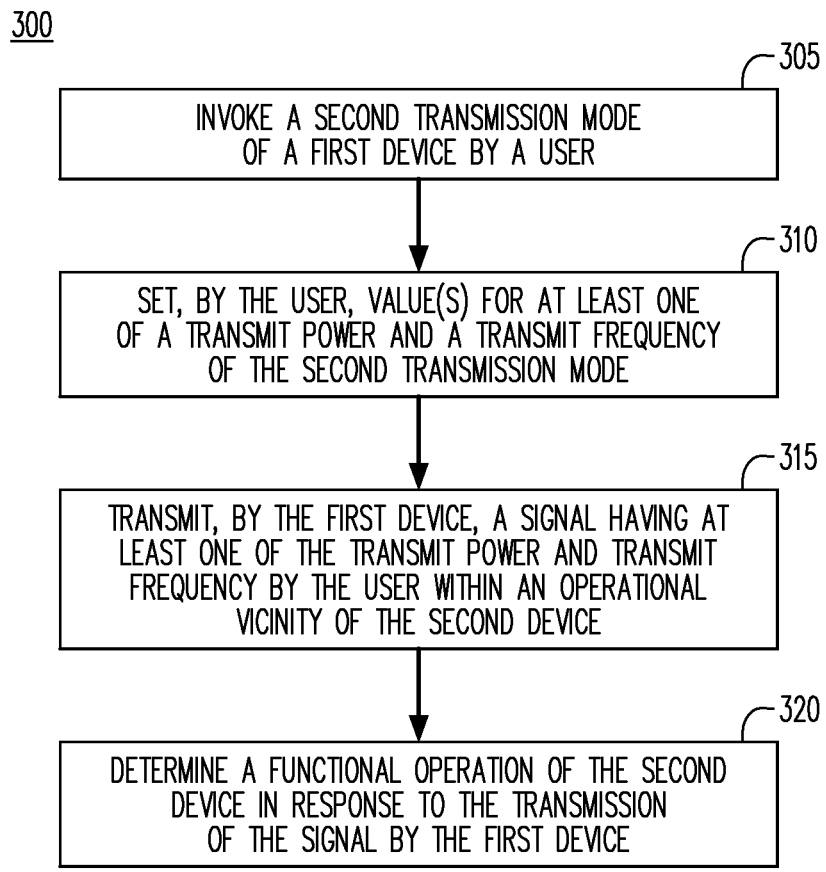
FIG. 3 is a flow chart illustrating processes that may be performed in accordance with testing the susceptibility of a second device to interference from a first device, in accordance with aspects of some embodiments herein.

FIG. 3 is an illustration of a flow diagram of method for determining whether a mobile telephone or other wireless communication device interferes with an operation of another or second device. The method of FIG. 3 is generally referenced by reference numeral 300. In general, interference herein refers to any alteration, modification, or disruption of a signal or message of a device. Typically, the interference will provide an unwanted signal in addition to the useful or desired signals used or produced by the second device. As such, the second device may not reliably operate as designed, intended, or desired when subject to interference. Some forms of interference related to aspects herein may include, for example, electromagnetic interference, adjacent channel interference, co-channel interference, modulation, and other types of interference though not specifically listed but still within the scope of the present disclosure herein.

At operation 305, a second transmission mode is invoked or initiated by a user of a mobile telephone or other wireless communication device. The second transmission mode may be invoked by a variety of means and processes, as described above in some embodiments with reference to FIGS. 1 and 2. Operation 305 may include a user placing the mobile telephone into a "test" mode of operation.

At operation 310, one or more values for at least one wireless communication transmission signal parameter is provided or set by the user. The setting of the values for the at least one wireless communication transmission signal parameter of operation 310 may be accomplished in a variety of different ways, as described above with reference to operations 115/215 and 120/220 of FIGS. 1 and 2.

At operation 315, the mobile telephone may proceed to transmit a wireless transmission signal with the value(s) selected by the user. In some embodiments, including that of FIG. 3, the particular parameters set by the user in the second transmission mode may include at least one of a transmit power and a transmit frequency for the wireless transmission signal, although additional, fewer, and alternative parameters may be selectively set, varied, changed, and engaged by the user. The transmitted wireless communication signal may comprise one or more types of wireless communication signals the mobile phone is capable of transmitting. Some wireless communication signals may include cellular communications, including voice and data transmission having various transmit frequencies and powers.

At operation 320, a determination of a functional operation of the second device is made to ascertain whether the operation of the second device is impacted or interfered with due to the transmission of the wireless communication signal from the mobile telephone operating in the second transmission mode. The functional operation of the second device may include one or more functions of the second device.

In some instances, the functional operation of the second device may include a function or mode of operation that is independent of the mobile telephone and does not include any interaction between the mobile telephone and the second device. In some other instances, the functional operation of the second device may include a function or mode of operation that includes an interaction between the mobile telephone and the second device. For example, in some contexts the mobile telephone may include components and functionalities that allow the mobile telephone to be used as a Near Field Communication ("NFC") enabled device to conduct a payment transaction using a payment application stored on the mobile telephone and the second device may include a contactless-Point of Sale ("POS") terminal at a retail or other location that may interact with the NFC-enabled mobile telephone to complete the payment transaction. The mobile telephone may be manipulated by the user to transmit a wireless transmission signal with the value(s) selected by the user, in accordance with operations 305-315. The mobile telephone may be positioned in the vicinity of the second device (e.g., the contactless-POS terminal) and a determination may be made to find out whether the wireless communication transmission(s) from the mobile telephone interfere with the operation of the second device, as illustrated at operation 320. As used herein, the "vicinity' of the second device may extend from about 0 millimeters to about 50 meters, though an upper bound of about 5 meters to about 10 meters may be typical.

Continuing this example, the determination of whether the wireless communication transmission(s) from the mobile telephone interfere with the operation of the second device may be observed by the user, reported by some indication provided by the second device, and reported by some indication provided by the mobile telephone. In some instances, the determination may include at least one of the mobile telephone, the second device, and the user noting that the second device is fully operational within the operational tolerances of the second device in the presence of the mobile telephone transmitting in the second transmission mode. In some instances, the second device may provide an error or other indication that its operation is compromised by interference from the mobile telephone operating in the second transmission mode, while in other instances no error or specific indication is provided other than the second device is unable to operate as designed, intended, or desired in the presence of the mobile telephone operating in the second transmission mode.

In some contexts, the susceptibility of the operation of a second device such as a contactless-POS terminal or other electronic equipment to interference from a mobile telephone or other device operating in a second transmission mode and transmitting a wireless communication signal having parameter values set by the user is provided, in accordance with the method 300.

Figure 4:
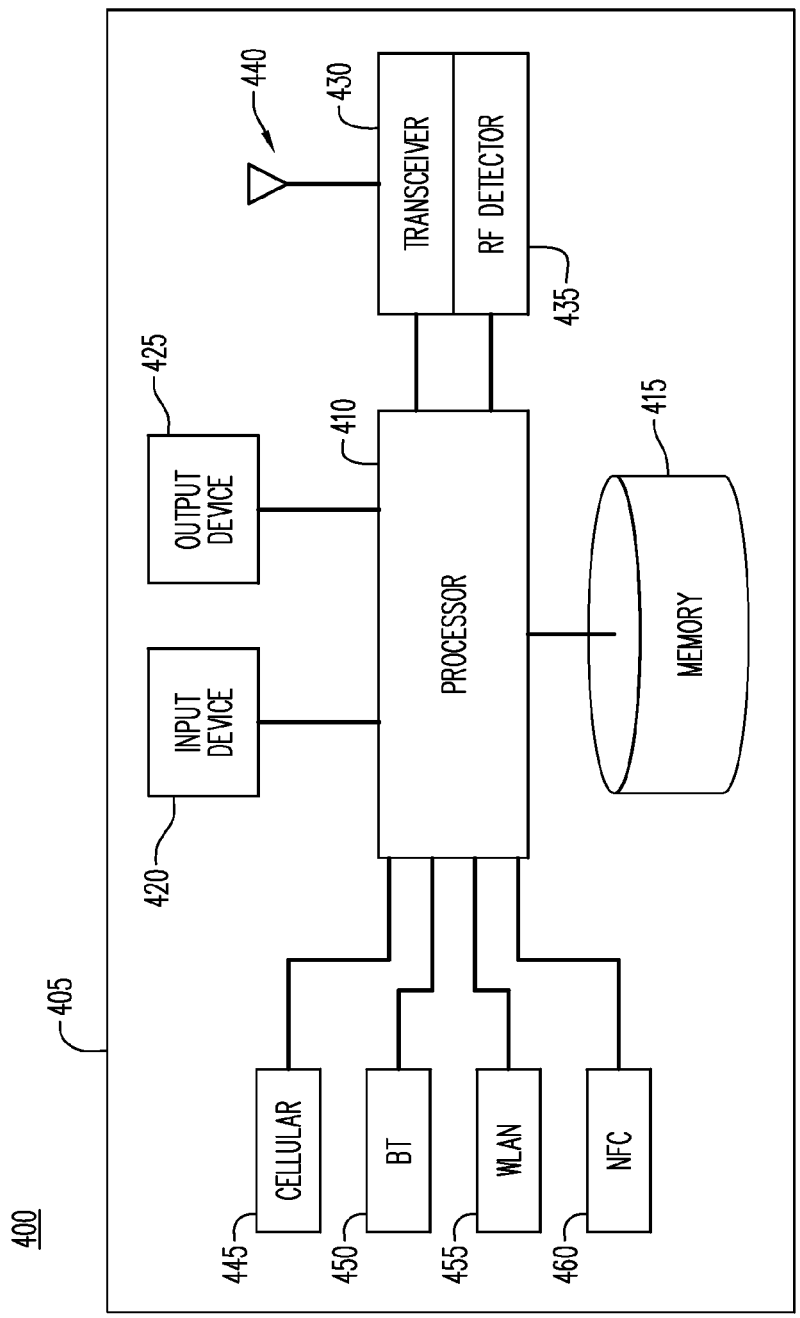
FIG. 4 is a schematic block diagram representation of a wireless communication device in which aspects of some embodiments herein may be implemented.

FIG. 4 provides a block diagram of an apparatus, device, or system 400 for a multifunctional mobile telephone/device 405 including a cellular telephone capability and a short-range wireless communication capability. FIG. 4 does not imply or necessarily represent a physical layout of mobile telephone 405. In its hardware and in some of its software/ firmware, mobile telephone 405 may be substantially conventional. However, mobile telephone 405 may include hardware, software, firmware, and combinations thereof to implement and embody aspects of the invention, including the methods and processes herein.

Mobile telephone 405 may include a conventional housing (not explicitly shown) that contains and/or supports the other components of the mobile telephone. The housing may, for example, be shaped and sized so as to be held in the user's hand (e.g., 505 of FIG. 5).

Mobile telephone 405 may include a processor 410 that processes and controls data in the mobile telephone that is interfaced with a memory 415 and capable of executing program instructions stored in memory 415, a transceiver 430 for transmitting and receiving communication signals to and from antenna 440, and a RF detector 435 comprising part of the transceiver for detecting RF signals. Though not separately depicted in FIG. 4, memory 415 may include or encompass, in various embodiments, random access memory (RAM), read only memory (ROM), a SIM card, and other types and forms of data storage devices and mediums.

Transceiver 450 may be coupled to antenna 440 and provides the communication channel(s) by which mobile telephone 405 communicates via a mobile network (not shown). The transceiver is in communication with antenna 440 that may serve to transmit and receive wireless wide-range and short-range communication signals. Mobile telephone 405 may also include an input device 420 (e.g., a keypad, keyboard, touchscreen system, voice input components, etc.) for receiving inputs from a user, and an output device 425 (e.g., a speaker, an indicator light, a display, etc.) for providing an output of the mobile telephone to the user or other entities.

In conventional fashion, transceiver 430 operates to transmit, via antenna 440, voice signals received from a user through input device 420, and operates to reproduce, via output device 425 (e.g., a speaker), voice signals received via antenna 440. Transceiver 430 may also further operate to handle transmission and reception of text messages and/or other data communications via antenna 440. In some embodiments, mobile telephone 405 may transmit wireless communication signals with GSM 1900 MHz, GSM 1800 MHz, GSM 850 MHz, and other frequencies and with a maximum transmit power of about 30 dBM, 33 dBM, and the like.

Mobile telephone 405 may be capable of communicating with another device via cellular signals as provided by a cellular component or module 445 and a variety of short-range communication protocols, such as Bluetooth® as provided by a Bluetooth® module 450, by a wireless local area network (e.g., Wi-Fi, based on IEEE 802.11 b/g/n or other standards) as provided by a WLAN module 455, and by NFC signals as provided by NFC module or components 460 or the like.

In some embodiments, mobile telephone 405 may be a NFC-enabled mobile telephone equipped to operate as a secure proximity payment device and interact/communicate with another device (not shown in FIG. 4) such as a ticket kiosk/device and a contactless-POS terminal or other device that may include a radio frequency identification ("RFID") tag. In some embodiments, the contactless-POS or other device and mobile telephone 405 may typically be positioned in close proximity of each other when communicating using NFC signals. In some aspects, the contactless-POS or other device and mobile telephone 405 may be within about 0-10 millimeters of each other in order for a RF power field generated by either the mobile telephone and the contactless-POS terminal or other device to transfer data therebetween.

It is noted that the short-range communication platform used for communication between mobile telephone 405 and other devices may be any acceptable platform operating in any acceptable frequency band. For example, Bluetooth® or WLAN communications that operate in the 2.4 GHz frequency band, may be implemented. Communication is not however limited to the 2.4 GHz frequency band and may include communication in the 900 MHz frequency band, the 5.8 GHz frequency band, the 13.56 MHz frequency band or other frequency bands.

In some embodiments, the methods and processes herein, including the functionality and operation of a mobile telephone or other wireless communication device in accordance with the methods and processes herein may be included, supplied, or otherwise provisioned with the mobile telephone or other wireless communication device to operate independently of any other features of the mobile telephone or other wireless communication device.

In some embodiments, a mobile telephone or other wireless communication device provided in accordance with other aspects herein may inhibit or override one or more other modes of operation or features of the device when operating in the second transmission mode herein. For example, when the mobile telephone or other wireless communication device is operating in the second transmission mode per the methods and processes disclosed herein, features such as, for example, cellular voice calls may not be simultaneously permitted. In some embodiments, an incoming and/or outgoing voice call, occurring simultaneously to the mobile telephone or other wireless communication device operating in the second transmission mode of operation, may terminate or suspend the second transmission mode of operation. In some other embodiments, an incoming and/or outgoing voice call may occur simultaneously to the mobile telephone or other wireless communication device operating in the second transmission mode of operation.

Figure 5:
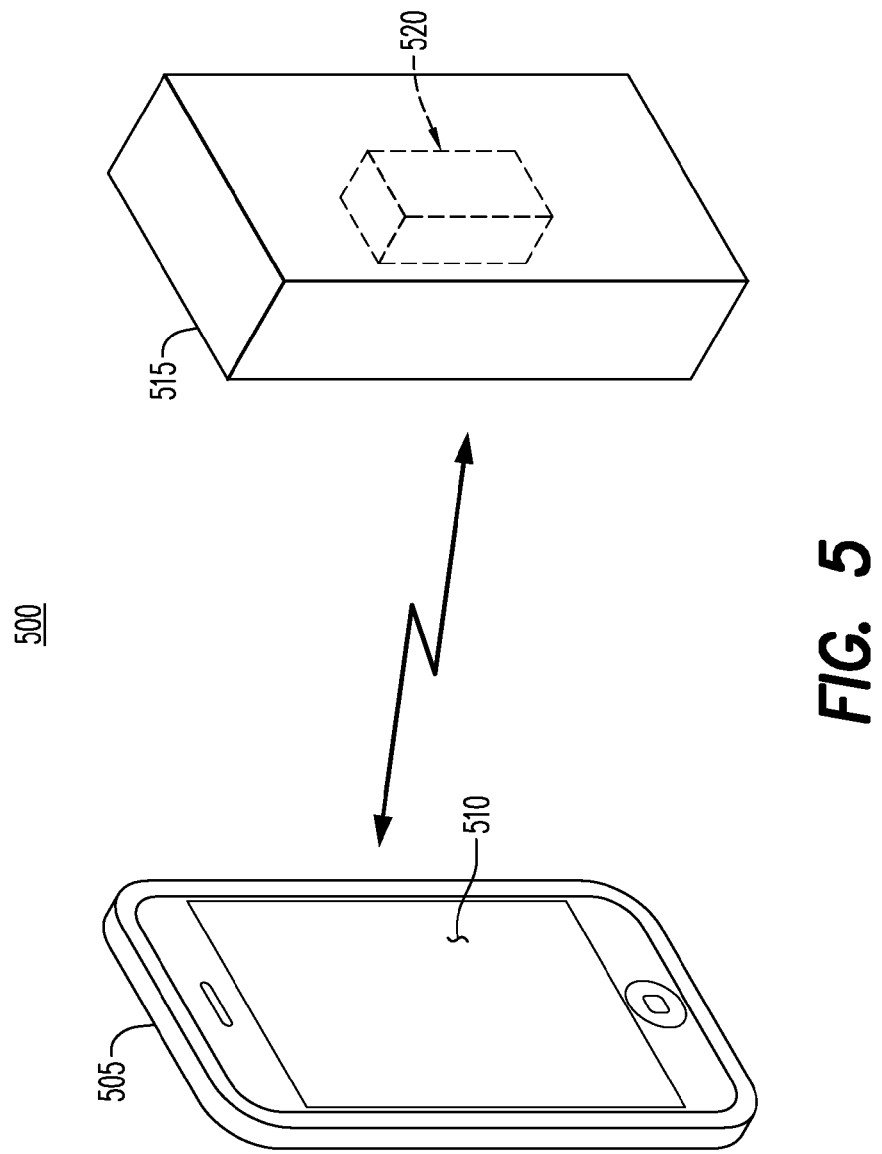
FIG. 5 illustrates a wireless communication device wirelessly communicating in a vicinity of another device, in accordance with some embodiments herein.

Referring to FIG. 5, shown is an illustrative depiction of a system 500 including wireless communication of a mobile telephone 505 in the vicinity of a second device 515. Mobile telephone 505 may, in some embodiments, include some of the same features and components as mobile telephone 405 of FIG. 4. Second device 515 may be any type or configuration of an electronic device. In the example of FIG. 5, mobile telephone 505 includes a touchscreen interface 510 that provides a mechanism for receiving a user input and providing outputs to the user and second device 515 includes a wireless communication module 520 for communicating wirelessly via at least one communication protocol. In some embodiments, system 500 may be used to implement the processes and methods disclosed herein, including but not limited to the methods provided in FIGS. 1-3. Accordingly, mobile telephone 505 may receive signals generated in response to user inputs that cause the mobile telephone to operate in a second transmission (i.e., test) mode, where a wireless communication signal is transmitted having user selected values for at least one parameter of the transmitted signal and the mobile telephone is in close proximity to a second device 515; and at least one operational function of the second device is monitored to determine whether the second device is susceptible to interference caused by the transmission of the wireless communication signal by the mobile telephone.

Second device 515 may include a conventional contactless-POS terminal, where block 520 represents a conventional proximity reader interfaced to or incorporated in the POS terminal. To allow a payment-enabled mobile telephone such as, for example, mobile telephone 505 9ot other payment device) to upload payment card account and other information to POS terminal 515 and otherwise to communicate with the POS terminal, the user may tap payment-enabled mobile telephone 505 on or near the proximity reader 520.

Wireless communication between payment-enabled mobile telephone 505 and proximity reader 515 is indicated by the arrow between the devices in FIG. 5. The wireless communication between the devices of FIG. 5 may also include handshaking signals, device authentication, and security procedures. In some embodiments, a payment application of mobile telephone 505 may operate so as to interact with an RFID/NFC proximity reader 520 of contactless-POS terminal 515 to provide a payment card account number and other information for a purchase transaction at the POS terminal.

The above description and/or the accompanying drawings are not meant to imply a fixed order or sequence of steps for any process referred to herein; rather any process may be performed in any order that is practicable, including but not limited to simultaneous performance of steps indicated as sequential.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A method comprising:
   detecting a first signal by a controller, the first signal being generated in response to a user input;
   switching, in response to detecting the first signal, a wireless transmitter circuitry from a first transmission mode to a second transmission mode, the second transmission mode having at least one of a transmit power and a transmit frequency selectively set by a user;
   receiving a second signal by the controller, the second signal being generated in response to a user input and includes an indication of a specific value selectively provided by the user for setting the at least one of transmit power and transmit frequency associated with the second transmission mode; and
   setting, in response to receiving the second signal, the at least one of transmit power and transmit frequency associated with the second transmission mode to the specific value selectively provided by the user.

2. The method of claim 1, wherein the user input comprises a predetermined sequence of user supplied inputs.

3. The method of claim 1, wherein the switching further comprises disabling at least one of a transmit power and a transmit frequency associated with the first transmission mode.

4. The method of claim 1, wherein the specific value selectively provided by the user for setting the at least one of transmit power and transmit frequency associated with the second transmission mode is provided in one of the following manners: selected from a plurality of predetermined values, set to a predetermined fixed value, set to a maximum value, and variably set by the user between a first value and a second value.

5. The method of claim 1, further comprising switching, in response to detecting a third signal, the wireless transmitter circuitry from the second transmission mode to the first transmission mode, wherein a transmit power and a transmit frequency associated with the first transmission mode is not selectively set by the user.

6. The method of claim 1, further comprising transmitting a wireless signal having the specific value selectively provided by the user for the at least one transmit power and transmit frequency associated with the second transmission mode.

7. A wireless communication device, comprising:
   a housing;
   an antenna mounted in or on the housing;
   at least one user interface element mounted on the housing to receive a user input;
   a transmitter mounted in the housing and coupled to the antenna to transmit a wireless communication signal; and a processor in the housing, the processor enabled to:
  detect a first signal, the first signal being generated in response to a user input;
  switch, in response to detecting the first signal, the transmitter from a first transmission mode to a second transmission mode, the second transmission mode having at least one of a transmit power and a transmit frequency selectively set by a user via the user interface element;
  receive a second signal, the second signal being generated in response to a user input and includes an indication of a specific value selectively provided by the user for setting the at least one of transmit power and transmit frequency associated with the second transmission mode; and
  set, in response to receiving the second signal, the at least one of transmit power and transmit frequency associated with the second transmission mode to the specific value selectively provided by the user.

8. The device of claim 7, wherein the user input action comprises a predetermined sequence of user supplied inputs.

9. The device of claim 7, wherein the switching further comprises disabling at least one of a transmit power and a transmit frequency associated with the first transmission mode.

10. The device of claim 7, wherein the specific value selectively provided by the user for setting the at least one of transmit power and transmit frequency associated with the second transmission mode is provided in one of the following manners: selected from a plurality of predetermined values, set to a predetermined fixed value, set to a maximum value, and variably set by the user between a first value and a second value.

11. The device of claim 7, further comprising enabling the processor to switch, in response to detecting a third signal, the transmitter from the second transmission mode to the first transmission mode, wherein a transmit power and a transmit frequency associated with the first transmission mode is not selectively set by the user.

12. The device of claim 7, further comprising enabling the processor to transmit a wireless signal having the specific value selectively provided by the user for the at least one transmit power and transmit frequency associated with the second transmission mode.

13. A non-transitory medium having computer-executable instructions stored thereon, the medium comprising:
  instructions to detect a first signal, the first signal being generated in response to a user input;
  instructions to switch, in response to detecting the first signal, a transmitter from a first transmission mode to a second transmission mode, the second transmission mode having at least one of a transmit power and a transmit frequency to be selectively set by a user;
  instructions to receive a second signal, the second signal being generated in response to a user input and includes an indication of a specific value selectively provided by the user for setting the at least one of transmit power and transmit frequency associated with the second transmission mode; and
  instructions to set, in response to receiving the second signal, the at least one of transmit power and transmit frequency associated with the second transmission mode to the specific value selectively provided by the user.

14. The non-transitory medium of claim 13, wherein the user input comprises a predetermined sequence of user supplied inputs.

15. The non-transitory medium of claim 13, comprises instructions for disabling at least one of a transmit power and a transmit frequency associated with the first transmission mode.

16. The non-transitory medium of claim 13, wherein the specific value selectively provided by the user for setting the at least one of transmit power and transmit frequency associated with the second transmission mode is provided in one of the following manners: selected from a plurality of predetermined values, set to a predetermined fixed value, set to a maximum value, and variably set by the user between a first value and a second value.

17. The non-transitory medium of claim 13, further comprising instructions for switching, in response to detecting a third signal, the transmitter from the second transmission mode to the first transmission mode, wherein a transmit power and a transmit frequency associated with the first transmission mode is not selectively set by the user.

18. The non-transitory medium of claim 13, further comprising instructions for transmitting a wireless signal having the specific value selectively provided by the user for the at least one transmit power and transmit frequency associated with the second transmission mode.

* * * * *